(12) United States Patent
Lepeska et al.

(10) Patent No.: US 11,328,306 B1
(45) Date of Patent: May 10, 2022

(54) SYSTEMS AND METHODS FOR INTERACTIVE TOOLS FOR DYNAMIC EVALUATION OF ONLINE CONTENT

(71) Applicant: VIASAT, Inc., Carlsbad, CA (US)

(72) Inventors: Peter Lepeska, Boston, MA (US); Devin Toth, Quincy, MA (US); Robert LaMarre, Medford, MA (US)

(73) Assignee: VIASAT, INC., Carlsbad, CA (US)

( * ) Notice: Subject to any disclaimer, the term of this patent is extended or adjusted under 35 U.S.C. 154(b) by 254 days.

(21) Appl. No.: 16/807,033

(22) Filed: Mar. 2, 2020

Related U.S. Application Data

(62) Division of application No. 15/692,611, filed on Aug. 31, 2017, now Pat. No. 10,614,469.

(51) Int. Cl.
*G06Q 30/00* (2012.01)
*H04N 21/258* (2011.01)
*H04L 51/063* (2022.01)
*H04L 51/52* (2022.01)
*G06F 16/583* (2019.01)

(52) U.S. Cl.
CPC ......... *G06Q 30/018* (2013.01); *G06F 16/583* (2019.01); *H04L 51/063* (2013.01); *H04L 51/32* (2013.01); *H04N 21/258* (2013.01)

(58) Field of Classification Search
None
See application file for complete search history.

(56) References Cited

U.S. PATENT DOCUMENTS

| | | |
|---|---|---|
| 7,822,631 B1 | 10/2010 | Vander Mey et al. |
| 10,614,469 B1 | 4/2020 | Lepeska et al. |
| 2008/0201348 A1 | 8/2008 | Edmonds et al. |
| 2010/0095196 A1* | 4/2010 | Grabamik ............ G06F 16/355 715/230 |
| 2012/0197979 A1 | 8/2012 | Palm et al. |

OTHER PUBLICATIONS

U.S. Appl. No. 15/692,611, Non-Final Office Action dated Aug. 23, 2019, 10 pages.
U.S. Appl. No. 15/692,611, Notice of Allowance dated Dec. 12, 2019, 7 pages.

\* cited by examiner

*Primary Examiner* — Mila Airapetian
(74) *Attorney, Agent, or Firm* — Chang & Hale LLP

(57) ABSTRACT

Systems, computer-readable media, methods, and apparatuses for interactive tools for dynamic evaluation of online content are described. One example method includes receiving, by a client device, a selection of first content from a first content provider, the first content obtained using a first uniform resource identifier ("URI"); in response to receiving, by the client device, a request to access evaluation information associated with the first URI, transmitting a request to access the evaluation information to a second content provider using a second URI; receiving, by the client device from the second content provider, second content associated with the first URI, the second content having the evaluation information; generating, by the client device, annotations for the first content using the evaluation information; and displaying the first content and the annotations, the annotations displayed within the first content.

24 Claims, 14 Drawing Sheets

FIG. 8 https://www.contenteval.com/www.ncweathernews.com/green_sky.html — 806

700

URI for Evaluation: www.ncweathernews.com/green_sky.html — 820
↑
706

Content for Evaluation: — 830

North Carolina Surprised By Neon Green Morning Sky!

Residents of eastern North Carolina were greeted by the strange sight of a neon green sky this morning. Sources at NASA indicated that the oddly-colored sky was due to increasing levels of swamp gas arriving via the Jetstream from South America. The sky is expected to return to its typical hue later this week as the gas dissipates.

Select One: — 840    Support — 842a    Refute — 842b

Citation: < Enter URI Supporting or Refuting Content for Evaluation > — 850

Submit — 860 https://www.contenteval.com/www.ncweathernews.com/green_sky.html?"

URI for Evaluation: www.ncweathernews.com/green_sky.html?"Re..

Selection for Evaluation:

Residents of eastern North Carolina were greeted by the strange sight of a neon green sky this morning.

Select One: Support  Refute

Citation: < Enter URI Supporting or Refuting Content for Evaluation >

Submit

FIG. 9

SYSTEMS AND METHODS FOR INTERACTIVE TOOLS FOR DYNAMIC EVALUATION OF ONLINE CONTENT

CROSS-REFERENCE TO RELATED APPLICATIONS

This application is a divisional of U.S. patent application Ser. No. 15/692,611, filed Aug. 31, 2017, and titled "Systems and Methods for Interactive Tools for Dynamic Evaluation of Online Content," the entirety of which is hereby incorporated by reference.

FIELD

The present application generally relates to providing interactive tools to allow interactive and dynamic, inline confirmation or refutation of online content, and more specifically relates to systems and methods for interactive tools for dynamic evaluation of online content.

BACKGROUND

Online content can provide people with a variety of information through various media, including web news sites, social media, videos, etc. When confronted with such information, users are left to judge for themselves the credibility of the information or portions of the information. In some cases it can be difficult to determine whether information presented online is from a credible source or is itself accurate. To do so, a user may seek out corroboration from other web sites or sources of information the user finds credible.

SUMMARY

Various examples are described for systems and methods for interactive tools for dynamic evaluation of online content. One example method includes receiving, by a client device, a selection of first content from a first content provider, the first content obtained using a first uniform resource identifier ("URI"); in response to receiving, by the client device, a request to access evaluation information associated with the first URI, transmitting a request to access the evaluation information to a second content provider using a second URI; receiving, by the client device from the second content provider, second content associated with the first URI, the second content having the evaluation information; generating, by the client device, annotations for the first content using the evaluation information; and displaying the first content and the annotations, the annotations displayed within the first content.

An example non-transitory computer-readable medium comprising processor-executable instructions configured to cause a processor to: receive a selection of first content from a first content provider, the first content obtained using a first uniform resource identifier ("URI"); in response to receipt of a request to access evaluation information associated with the first URI, transmit a request to access the evaluation information to a second content provider using a second URI; receive, from the second content provider, second content associated with the first URI, the second content having the evaluation information; and generate one or more annotations for the first content using the evaluation information; and display the first content and the one or more annotations, the one or more annotations displayed within the first content.

Another example method includes receiving, from a remote client device, a first uniform resource identifier ("URI") for first content available from a first content provider; receiving, from the remote client device, quality information associated with the first content; receiving, from the remote client device, a second URI for second content available from a second content provider, the second content related to a portion of the first content and the quality information; obtaining an evaluation web page associated with the first URI and updating the evaluation web page based on the quality information and the second URI.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 4-9 show example graphical user interfaces for interactive tools for dynamic evaluation of online content;

DETAILED DESCRIPTION

Examples are described herein in the context of systems and methods for interactive tools for dynamic evaluation of online content. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

A user surfing the internet may browse through various web sites, such as news sites, that present articles or other information for the user to read or view. For example, a user may arrive at an article on a website. After reading the article, the user believes that the information presented is incorrect or is otherwise misleading. Some web pages allow a user to leave a written comment about the article, which may be read by other users or by the publisher of the content and are under the publisher's control. However, such comments are typically unsupported assertions and in some cases are only visible if the user expressly indicates she would like to see them. To help provide users with ascertaining the truth (or falsity) of web content, examples according to the present disclosure present user interface ("UI") features to allow the user to provide citations or other indicia to content that supports or refutes the content, or portion of the content. The UI features may include, or cause, modifications or annotations to the presented content that may then be visible to other users who access that content.

Figure 1:
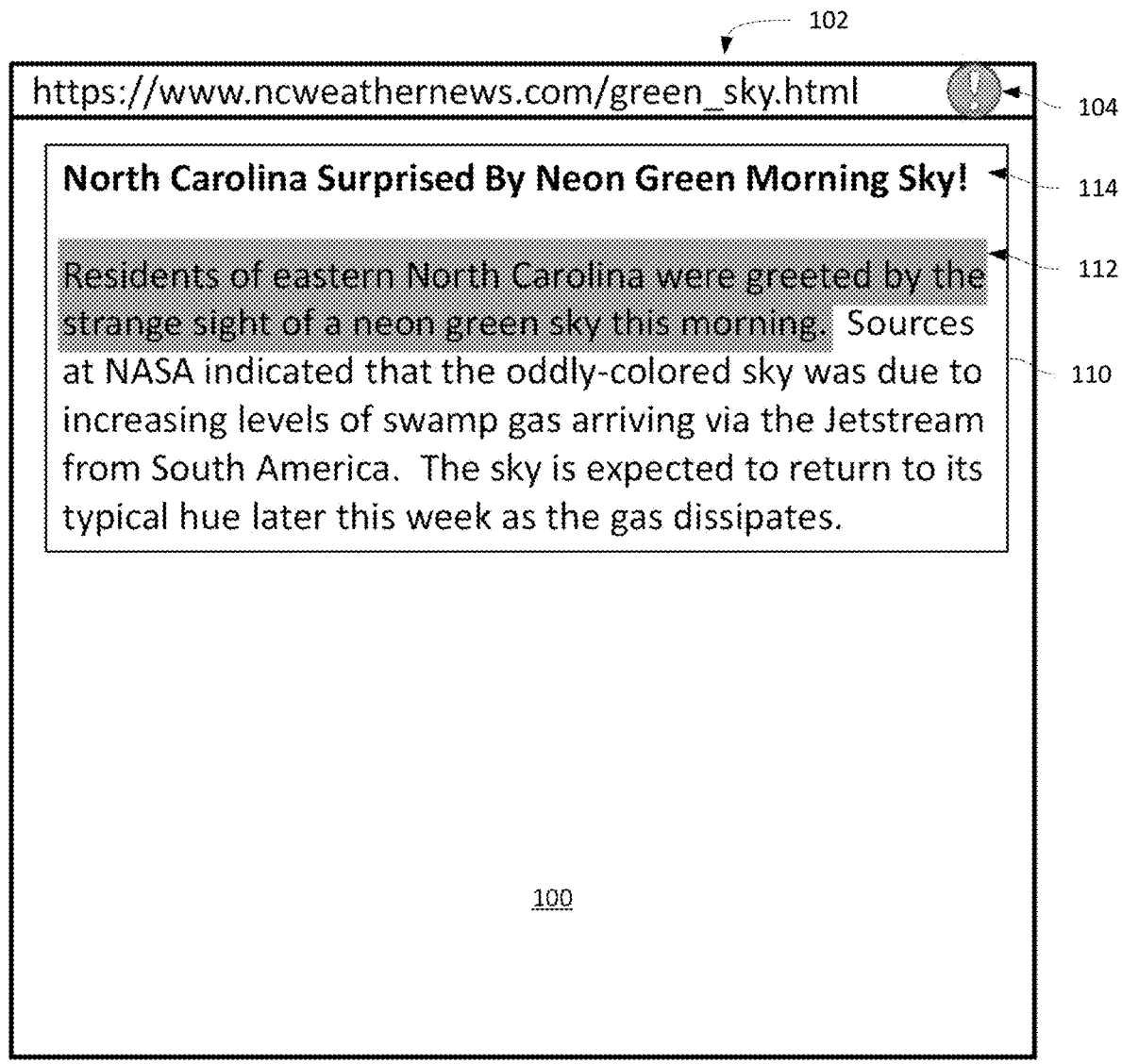
FIG. 1 shows an example graphical user interface for interactive tools for dynamic evaluation of online content.

In one example, the user browses to a web page, such as the web page 110 shown in FIG. 1, which presents a news article. The universal resource identifier ("URI") 102, such as a universal resource locator ("URL"), for the web page 110 is visible within the web browser window 100. In this example, the article describes a neon green morning sky in eastern North Carolina. In addition to the web page 110 and the URL 102, the browser 100 also presents a UI element 104 that allows the user to interact with the web page to provide evidence to support or refute information presented in the article.

In this example, the user does not believe that the premise of the article is true, so she investigates whether the sky was actually neon green in North Carolina. To do so, she accesses a website for a news station located in eastern North Carolina, which indicates the weather is normal. She then highlights 114 the first sentence of the article and clicks on the UI element 104 to provide a citation to the URI for the news station's website and an indication that the citation refutes the statement. The URI and the indication are forwarded to a content evaluation service, which generates a new web document corresponding to the URI 102 and associates the received URI and indication with the URI 102 for the article.

At later time, when another user accesses the URI 102 for the article, the user's web browser may send a request to the content evaluation service to request any evaluation information for the URI 102. The content evaluation service may respond with the newly-generated web document, which the browser may then use to annotate the article 110. For example, it may highlight 112 the first sentence and, if the user hovers the mouse cursor over the highlighted portion 112, a window may appear indicating the citation or provide a link to the newly-generated web document. Thus, users may be able to provide evidence to support or refute online content without providing their own subjective comments as the evidence, but instead, provide evidence from another source. Further, other users may be allowed to respond to such evidence to increase or decrease the weight of the evidence. And in some examples, the content evaluation service may generate and provide a score indicating whether the evidence indicates the selected content is true or not, and indicating the relative weight of the evidence. Such information may then be presented within the web page, such as via annotations or overlaid information.

This illustrative example is given to introduce the reader to the general subject matter discussed herein and the disclosure is not limited to this example. The following sections describe various additional non-limiting examples and examples of systems and methods for interactive tools for dynamic evaluation of online content.

Figure 2:
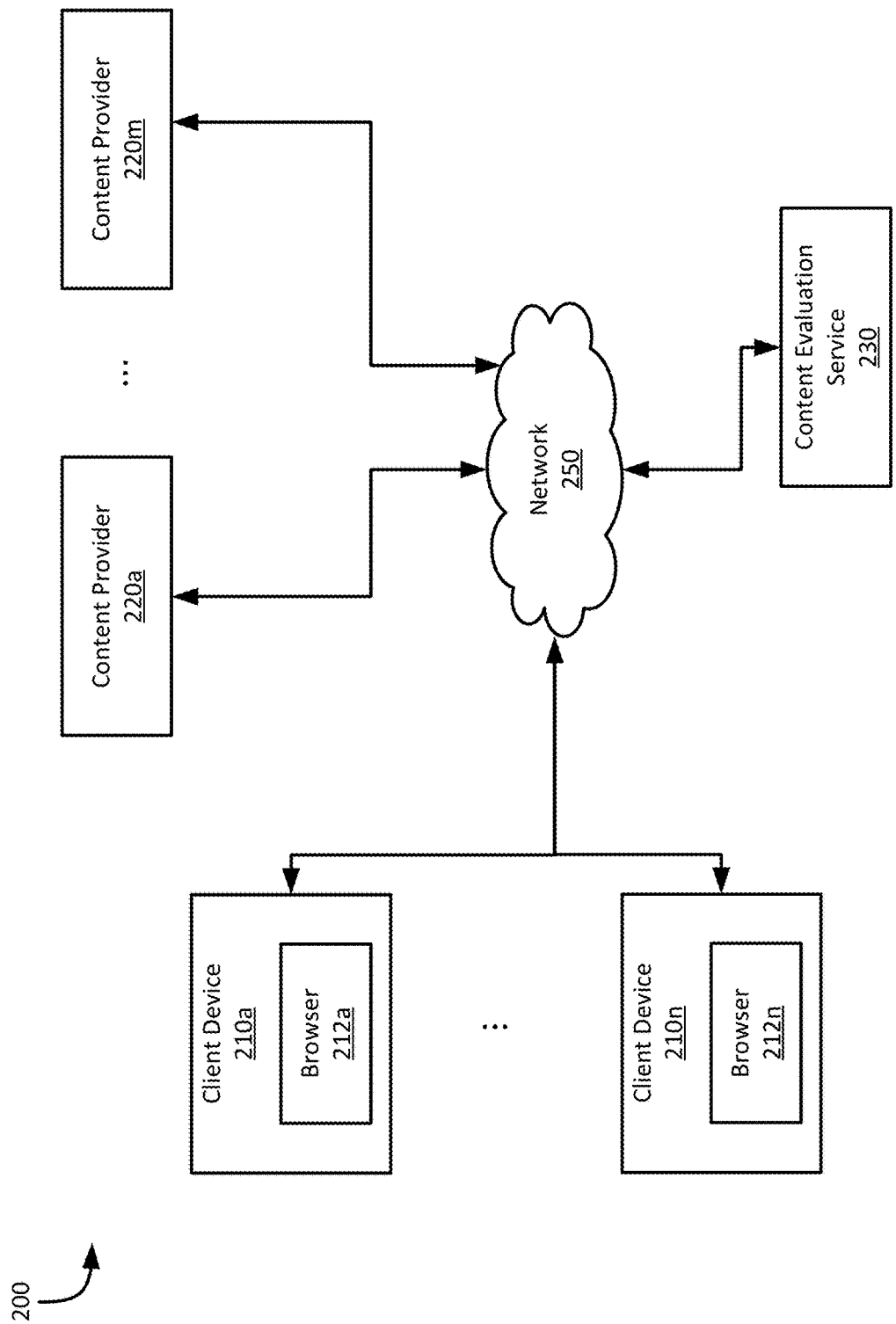
FIG. 2 shows an example system for interactive tools for dynamic evaluation of online content.

Referring now to FIG. 2, FIG. 2 shows an example system 200 for interactive tools for dynamic evaluation of online content. In this example, the system 200 includes multiple client devices 210*a-n*, multiple content providers 220*a-m*, and a content evaluation service 230. The client devices 210*a-n*, content providers 220*a-m*, and content evaluation services 230 are all in communication over one or more communication networks 250. In this example, the network 250 is the internet, however, any suitable network may be employed, including a local area network ("LAN"); a wide area network ("WAN"), such as the internet; metropolitan area network ("MAN"); etc. It should be appreciated that the 'n' in client device 210*n*'s label is intended to indicate an arbitrary number of client devices, e.g., n client devices. Similarly, the 'm' in content provider 220*m*'s label also indicates an arbitrary number of clients, e.g., m content providers. It should be appreciated that either or both of m and n may have any value of one or greater.

Each client 210*a-n* executes a web browser 212*a-n* that allows a user to access content available via the network 250, such as one or more web sites. Any suitable web browser may be employed, such as Chrome®, Internet Explorer®, Safari®, Firefox®, etc. To access content using a web browser, such as web browser 212*a*, the user may enter a URI for a web page into a navigation bar or may select a hyperlink. The web browser 212*a* then issues a request to the server associated with the selected URI, such as a server associated with one of the content providers 220*a-n*. The server may then respond to the request and provide the web page. The web page may include one or more references to other objects, such as images, videos, graphics, advertisements, or other content, which are also retrieved by the web browser 212*a* and displayed as defined within the web page.

The content providers 220*a-n* each represent one or more servers that hosts web objects available for retrieval by a web browser. For example, a content provider may be one or more servers operated by an individual, a business, or other entity. The term content provider is used in this example because a web page may be requested using a URI, which may be routed to any one of multiple servers or proxies that may respond to requests for a particular web page. In some examples, however, a web browser 212*a* may communicate directly with a particular web server when requesting a web page.

Content evaluation service 230 includes one or more servers that provide content evaluation services according to this disclosure. In this example, content evaluation server 230 receives requests from a web browser 212*a* for a specified URI, accesses any existing web objects with evaluation information associated with the specified URI, and provides information to the requesting web browser. The provided information may include the web objects themselves, information extracted from the web objects, or an indication regarding information available about the URI from the content evaluation service 230. Additional examples will be described in more detail below with respect to FIGS. 3-7.

In this example, the web browser 212*a* also includes functionality to access content evaluation for a web page or portion of a web page. In this example, the functionality is provided by one or more bookmarklets. "Bookmarklet" generally refers to a web browser bookmark or other activatable UI feature that stores a URI for a web page and also includes processor-executable instructions that may cause operations to be performed by the computing device 210*a* in addition to issuing a request to a content provider for the web page. For example, a bookmarklet may reference a URI for www.ncweathernews.com and also include processor-executable instructions that changes the font of the received web page, or that performs validation of the URI prior to issuing the request for the web page.

In this example, the web browser 212a includes a bookmarklet that references a web page at the content evaluation service 230. When the bookmarklet is selected while the user is viewing a webpage, the bookmarklet issues a request to the content evaluation service 230 that includes the URI of the web page being viewed (the "target" web page or content). The bookmarklet may then process information received from the content evaluation service 230 and provide it to user in some fashion. For example, activating the bookmarklet may cause the target web page to be replaced by a web page obtained from the content evaluation service 230 with information about the previously-presented web page (the "evaluation" web page). Other behaviors may be implemented instead of (or in addition to) such behavior. For example, a bookmarklet may change the formatting of the displayed web page to indicate annotations, citations, credibility, etc., or it may display graphical or other interactive features within the target web page to allow the user to access evaluation information received from the content evaluation service 230.

While the example shown in FIG. 2 employs a bookmarklet feature, other approaches may be employed according to various examples. For example, a web browser may employ a browser plug-in or extension that provides one or more UI features to enable communications with the content evaluation service 230. For example, a browser plug-in may add a button to the web browser's UI to evaluate the web page being displayed in the web browser.

In one example, a browser plug-in or extension may add an additional navigation bar where a user may enter a URI or an excerpt from the web page being displayed. After entering the URI or excerpt, the user may press a button to submit the information to the content evaluation service 230. If the user enters a URI, the URI may be submitted. If the user enters an excerpt, the URI for the currently-displayed web page may be submitted along with the excerpt. The browser extension may then receive evaluation information from the content evaluation service 230 and provide it to the user. For example, the browser extension may insert annotations (e.g., footnotes, comment bubbles, etc.), visual indicators (e.g., overlays, icons, emojis, etc.), or interactive features (e.g., hyperlinks, videos, etc.) into the displayed web page, or overlaid on the displayed web page. The received information may provide information indicating the credibility or factual basis (or lack thereof) for the content within the displayed web page or portions of the displayed web page, as will be discussed in more detail below with respect to FIGS. 4-7.

Figure 3:
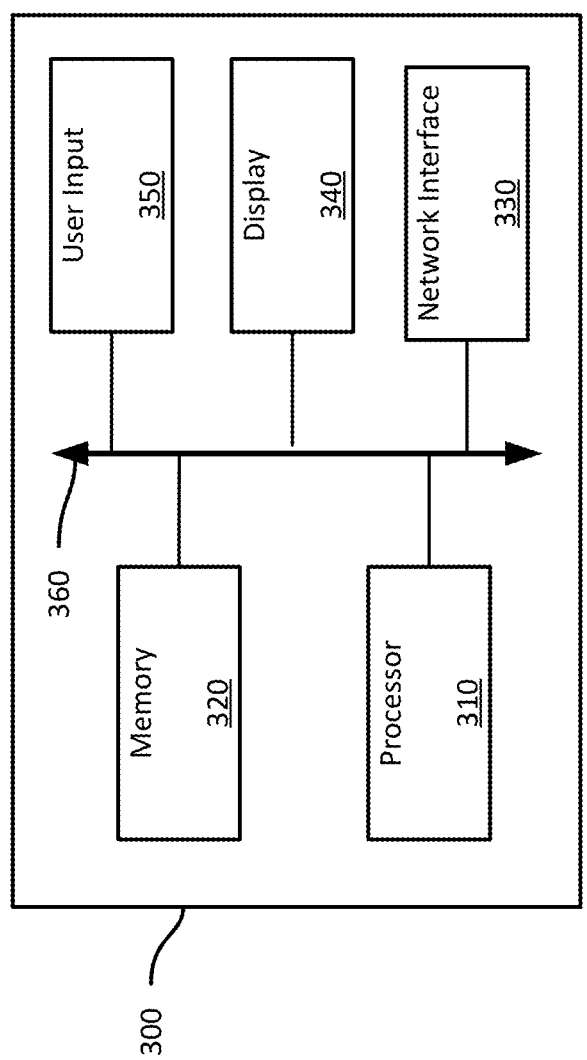
FIG. 3 shows an example computing device for interactive tools for dynamic evaluation of online content.

Referring now to FIG. 3, FIG. 3 shows an example computing device 300 suitable for employing interactive tools for dynamic evaluation of online content. The computing device 300 may be suitable for use as the client devices 210a-n of FIG. 2, but may also be suitable for use as one or more servers at a content provider 220a-n or at a content evaluation service 230. The computing device 300 includes a processor 310, a memory 320, a network interface 330, a display 340, and one or more user input device 350. Each of these components is in communication with other components via one or more communications buses 360. Examples of suitable processors and memories are discussed later in this specification. Further, it should be appreciated that in some examples, a suitable computing device according to this specification may not include a user input device 350 or a display 340, such as in the case of a server at a content provider 220a-n or content evaluation service 230.

In this example, the computing device 300 is configured to execute a web browser, such as web browser 212a, as described above with respect to FIG. 2. As discussed above, the web browser 212a includes functionality to enable interactive tools for dynamic evaluation of online content. When a user selects or enters a URI into the web browser 212a for desired content, the web browser 212a generates a request to transmit to a content provider, such as content provider 220a, for the requested content. When the initial request for the URL is transmitted, it initiates a "transaction" that, assuming everything operates correctly, will ultimately result in the requested content being retrieved and presented to the user in the web browser 212a. During the course of the transaction, the web browser 212a may issue multiple requests for content to multiple content providers and may receive, in response, multiple web resources in response to those requests. For example, the user may enter a URI for a news article. The content provider 220a may respond with an HTML document that includes the content of the news article, but also includes URI references to graphics objects, video objects, etc. available from one or more content other providers, which the web browser 212a then requests. When the web browser 212a renders the web page, it may display some or all of the web resources obtained from the various content service providers.

Figure 4:
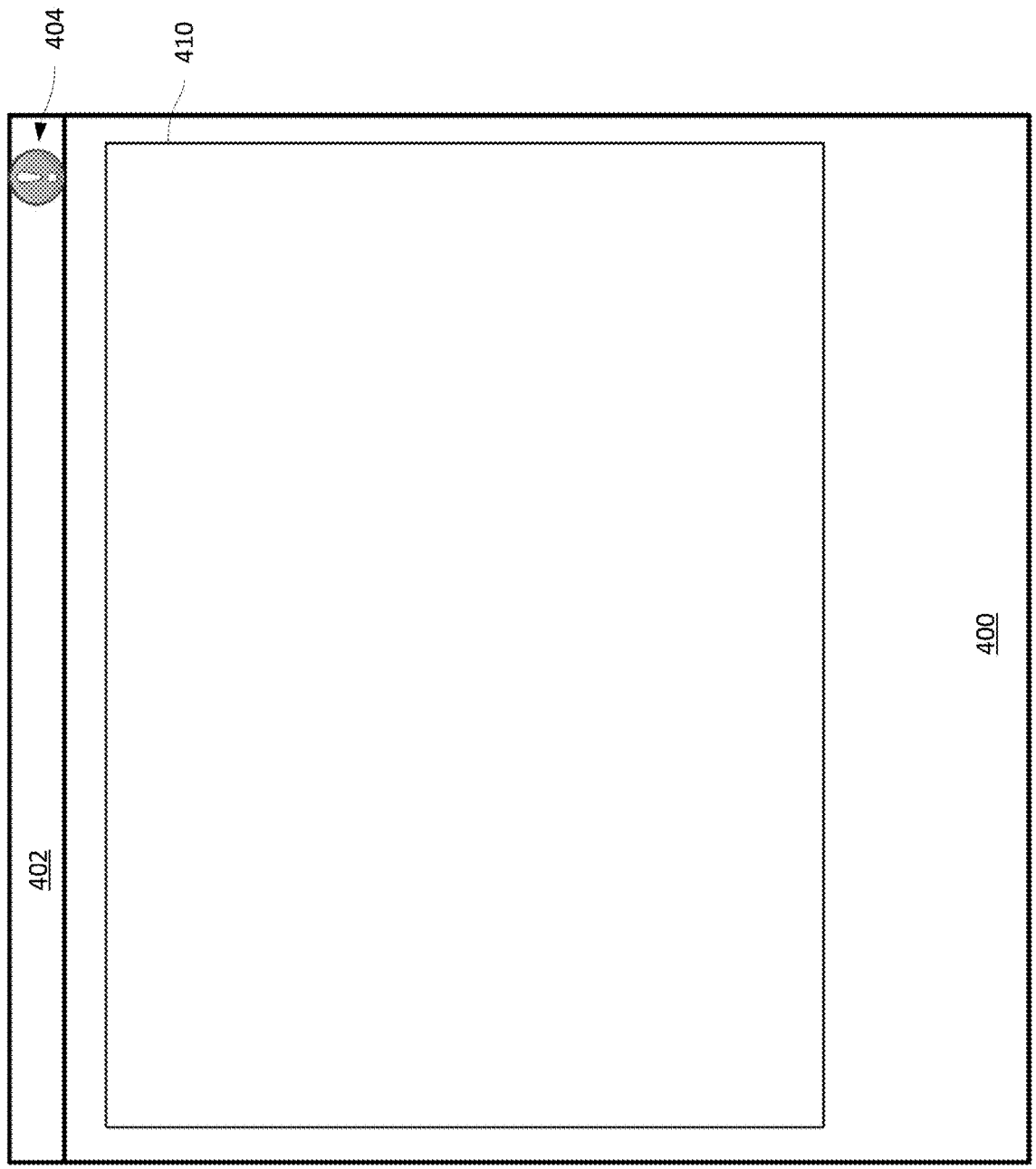

Referring now to FIG. 4, FIG. 4 shows an example web browser 400 that has an interactive tool for dynamic evaluation of online content. The web browser 400 presents a graphical UI ("GUI") to allow a user to obtain and view web pages from one or more content providers. The web browser 400 includes a navigation bar 402, a button 404 to activate functionality to provide dynamic evaluation of online content, and a content display area 410. The navigation bar 402 in this example may be used to input a URI of a web page or other web resource to access, and may display the URI of the web page or web resource displayed in the content window 410. The content window 410 is the visual region within the web browser 400 where retrieved web pages or other web resources may be displayed.

In this example, the interactive tool for dynamic evaluation of online content is provided as bookmarklet feature that includes processor-executable instructions generally as described above with respect to FIG. 2. Pressing the button 404 causes the web browser 400 to execute the bookmarklet's processor-executable instructions based on certain parameters discussed below. In this example, the bookmarklet also includes the URI for a content evaluation service, such as content evaluation service 230 of FIG. 2.

The button 404 provides an interactive GUI feature that can be activated by a user, such as by clicking it with a mouse cursor. Depending on the context of the web browser 400, clicking the button 404 may have different effects. If no web page has been selected or retrieved by the web browser 400, clicking the button 404 may have no effect, or it may prompt the user to enter a URI. In some examples, clicking the button 404 may cause the web browser 400 to navigate to a content evaluation service, such as content evaluation service 230, which may provide a main entry page into the content evaluation service's web site or other information about the content evaluation service.

If a URI has been entered into the navigation bar 402 or a web page is displayed within the content window 410, clicking the button 404 may generate and transmit a request to the content evaluation service 230 that includes the URI. Content received in response to the request may replace target content, or it may be stored within the web browser's memory and used to annotate or otherwise modify the appearance of the target content. In some examples, the content received from the content evaluation service 230 may include interactive portions to allow the user to provide information regarding the URI that supports or refutes content within the web page or resource associated with the URI, as will be described in more detail with respect to FIGS. 7-11.

In some examples, a user may select a portion of the content displayed in the content window, such as an excerpt or quote, or an embedded web resource, such as picture or video, and then press the button 404. When the button 404 is pressed, the bookmarklet may obtain excerpted or quoted content, or a URI of the selected embedded web resource. The bookmarklet may then generate a request to the content evaluation service 230 that includes the excerpted or quoted content or the URI of the selected embedded web resource. The bookmarklet may then process content received from the content evaluation service 230.

Figure 5:
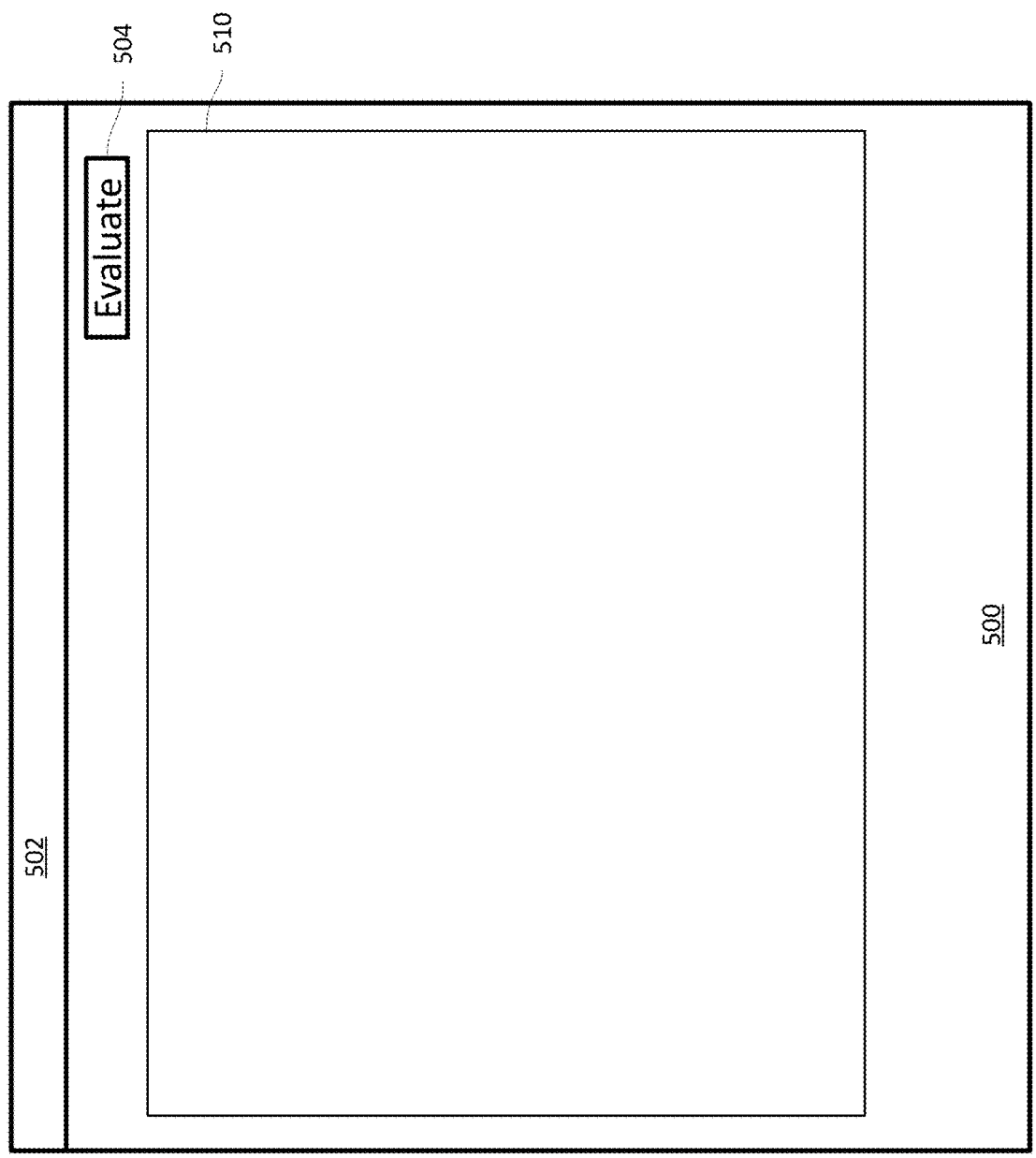

Referring now to FIG. 5, FIG. 5 shows another example web browser 500 that has an interactive tool for dynamic evaluation of online content similar to the example shown in FIG. 4. In this example, the web browser 500 includes a navigation bar 502, a button 504 to activate functionality to provide dynamic evaluation of online content, and a content display area 510, generally as described above with respect to FIG. 4. However, in this example, the button 504 in this example is provided by a browser plug-in or extension. Thus, pressing the button 504 may active processor-executable instructions within the plug-in or extension to communicate with a content evaluation service, generally as described above with respect to FIG. 4.

In addition, the browser plug-in or extension may provide additional features, such as a context-sensitive menu that may enable a user to select a portion of a displayed web page or resource, activate the context sensitive menu (e.g., by pressing a right mouse button), and select a menu item to evaluate the selected content. In some examples, the user may be able to enter a content evaluation mode within the browser 600 and then select a portion of the displayed content, which may then cause the browser plug-in or extension to generate and transmit a request to the content evaluation service 230 that includes the URI of the displayed content and the selected portion.

Figure 6:
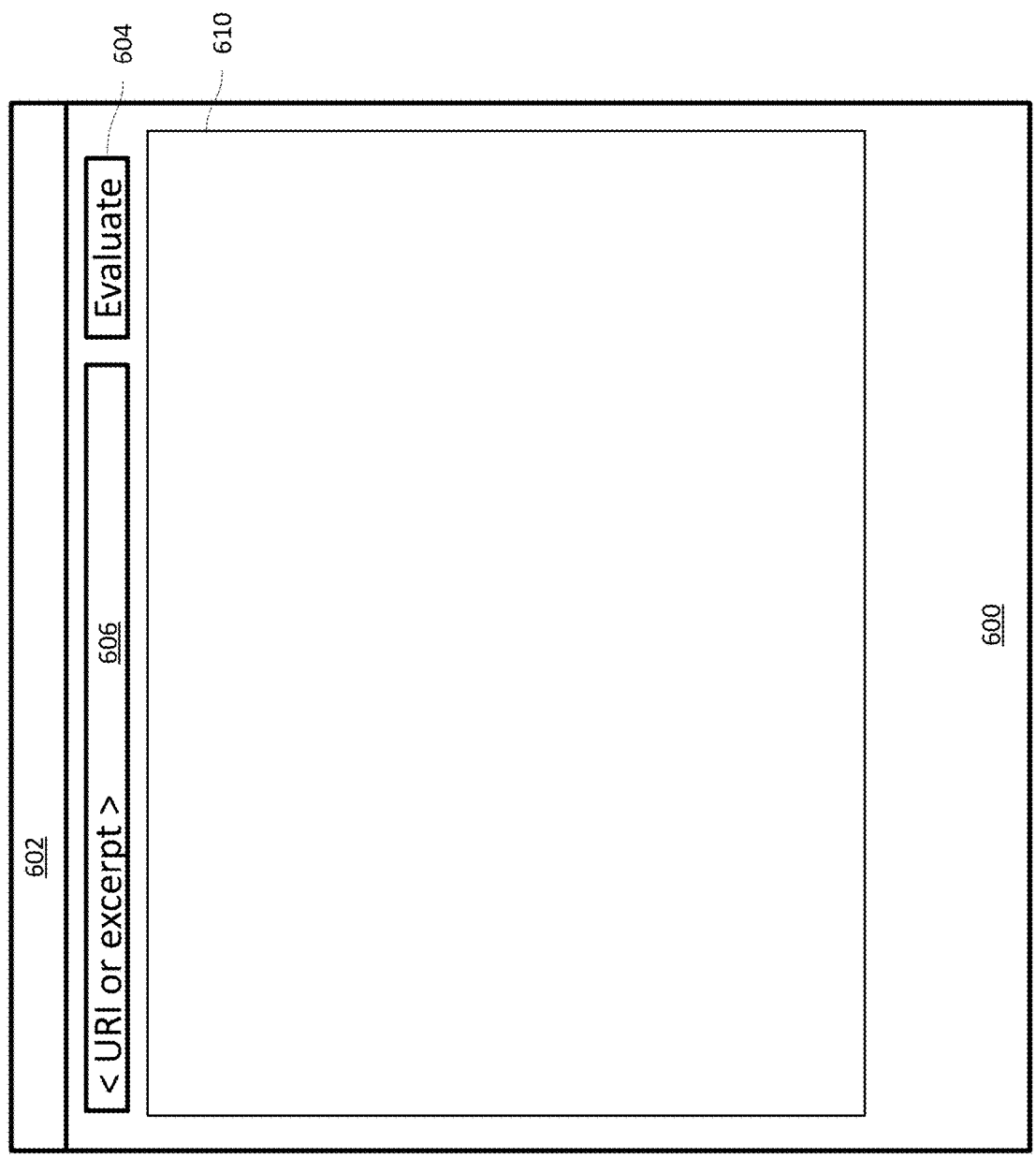

FIG. 6 shows another example web browser 600 that has an interactive tool for dynamic evaluation of online content similar to the example shown in FIG. 5. In this example, the web browser 600 includes a navigation bar 602, a button 604 to activate functionality to provide dynamic evaluation of online content, and a content display area 610 generally as described above with respect to FIG. 5. As with FIG. 5, the button in this example is provided by a browser plug-in or extension, however, the plug-in or extension also provides a content evaluation bar 606. The content evaluation bar 606 enables a user to enter a URI of a web page or web resource to evaluate independent of any URI in the navigation bar 602 or any web page or resource displayed in the content area 610. Alternatively, a user may enter an excerpt from the web page or resource displayed in the content window 610 and press the evaluate button 604.

If the user enters a URI into the content evaluation bar 606 and presses the evaluate button 604, the browser plug-in or extension provides the URI to the web browser 600 to initiate a web transaction to retrieve the web page or resource using the URI. In addition, the browser plug-in or extension transmits a request that includes the URI to a content evaluation service. The information received from the content evaluation service may be used to annotate or otherwise provide information to the user about the web page retrieved using the URI. Alternatively, if the user enters an excerpt into the content evaluation bar 606 and presses the button 604, the browser plug-in or extension generates and transmits a request to the content evaluation service that includes the excerpt and the URI of the web page or resource displayed in the content window 610. Thus, FIGS. 4-6 provide some examples of means for requesting evaluation of web content, such as a web page or resource or a portion of such a web page or resource.

In addition to requesting evaluation of a URI or a portion of content available from a URI, a user may interact with examples of interactive tools for dynamic evaluation of online content to provide evidence to support or refute content available from a URI.

Figure 7:
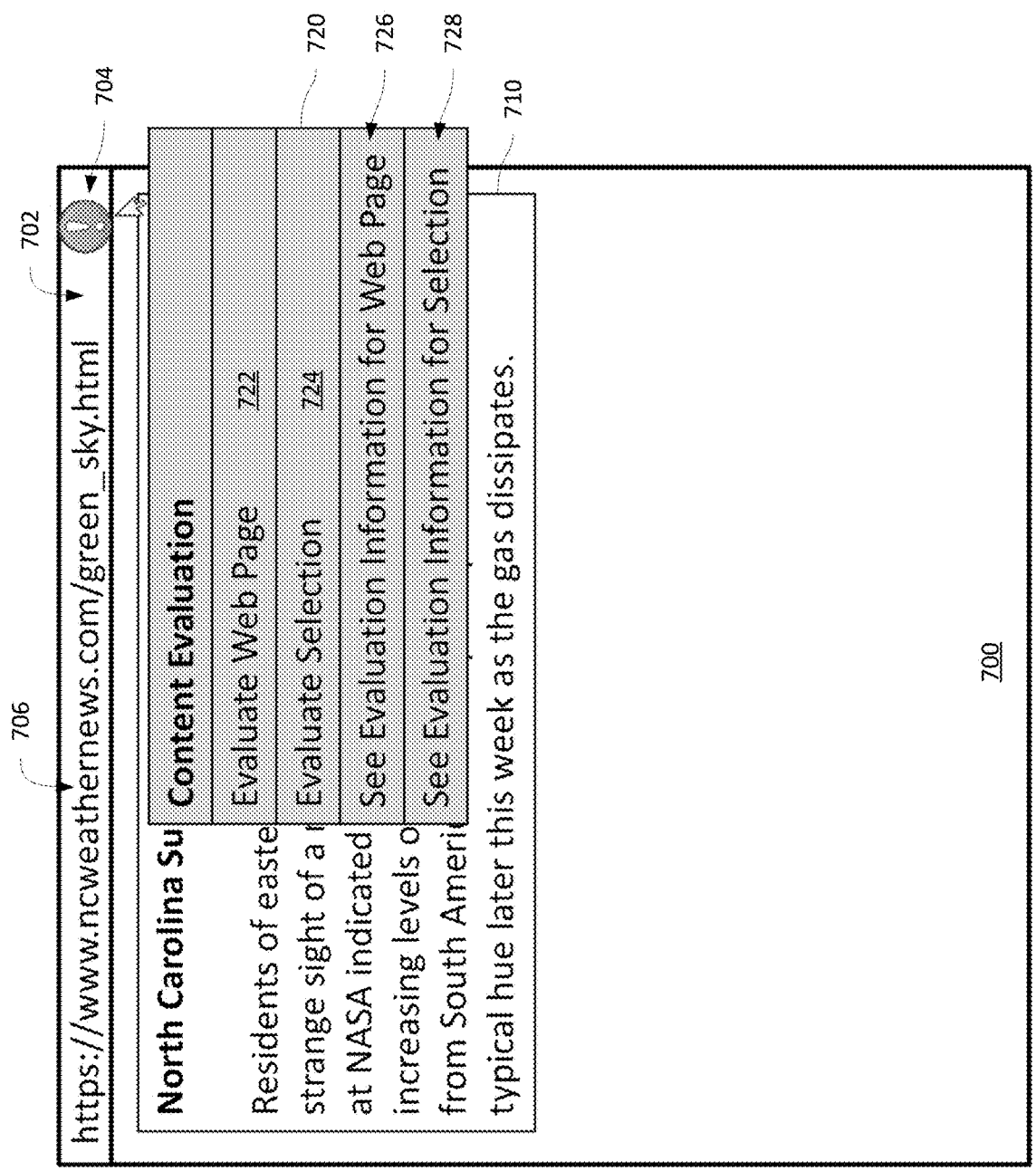

Referring now to FIG. 7, a user has navigated to a target web page 710 available at a URI 706. In this example, the target web page's content is displayed within the content window of a web browser 700 generally as discussed above. In this example, the web browser 700 also provides bookmarklet functionality to enable interactive evaluation of online content via an evaluation button 704. As discussed previously, the user may press the button 704 to activate the bookmarklet. The bookmarklet may then execute and transmit a request to a content evaluation service, such as the content evaluation service 230 of FIG. 2. In this example, the user does not select any portion of the web page content, but instead simply clicks the evaluation button 704 after the URI 706 has been entered into the navigation bar 702. In this example, the evaluation button 704 provides the user with the option of either obtaining or providing evaluation information about the web page by way of a context-sensitive menu 720. In this example, the context-sensitive menu 720 provides options to evaluate the web page 722, evaluate a selected portion of the web page 724, see evaluation information for the web page 726, or see evaluation information for a selected portion of the web page 728. The user selects the option to provide evaluation information for the web page 722. After receiving the selection, the web browser 700 transmits a request to the content evaluation service indicating the URI 702 and a request to provide evaluation information.

Referring now to FIG. 8, in this example the content evaluation service 230 provides an evaluation web page to the browser that is associated with the URI. In this example, if such a web page did not exist at the content evaluation service 230, it would generate a new evaluation web page document, such as from a template, generate an association between the new evaluation web page document and the URI, and store both the new evaluation web page and the association. Thus, if a subsequent request with the URI 706 is received, the evaluation web page 810 document can be located. In this example, because the user did not select a portion of the web page available at the URI 706, the evaluation web page 810 is associated with the URI 706; however, had the user selected a portion of the web page to evaluate, the content evaluation service 230 may provide an evaluation web page directed to the selected portion. Or in some examples, the content evaluation service 230 may provide the evaluation web page associated with the URI. Such an evaluation web page may include undifferentiated evaluation information about the entire web page or portions of the web page, or it may be structured to distinguish evaluation information about the web page as a whole versus selected portions of the web page. In this example, the user has opted to provide evaluation information about the web page as a whole, and so the content evaluation server 230 generates or obtains the evaluation web page associated with the URI 706 and provides it to the web browser 700.

FIG. 8 illustrates an example evaluation web page, which is displayed within the web browser's content window. In this example, the evaluation web page 810 provides an indication 820 of the evaluated URI 706, a display of the web page content 830 to be evaluated (or a portion of it, depending on space constraints), options 840 to support 842a or refute 842b the web page content, and a citation bar 850 into which a URI for evidence supporting the selected option 840. In this example, the submit button 860 may be pressed after the user has selected an option 840 and has entered a URI in the citation bar 850.

Using the evaluation web page, the user is thus able to provide an indication regarding whether the content 830 within the target web page is accurate or not, and to provide evidence, via a URI to a source, to support the user's contention. Notably, in this example, the user is not provided a location in which to enter her own subjective comments. Instead, the evaluation web page 810 is constructed to afford the opportunity to provide evidence-based evaluation of a web page's content. If multiple users provide evidence supporting or refuting the veracity of online content, others viewing a web page may be able to ascertain the likely accuracy or truthfulness of the content, or identify likely fake news or otherwise inaccurate information.

After the user selects an option 840 and enters a URI in the citation bar 850, she may press the submit button 860 to submit the information to the content evaluation service 230. The content evaluation service 230 may then update the evaluation web page 810 for the identified URI 706. In some examples, the content evaluation service 230 may first validate the provided URI, such as to ensure that the URI references valid content rather than a blank page, a page not found error (e.g., an HTTP 404 error), or to an invalid web server (e.g., no DNS entry for the web server is available). In this example, the content evaluation server 230 does not attempt to otherwise verify the quality or accuracy of the URI submitted using the content bar 850. Instead, as will be discussed with respect to FIG. 11, users may be provided the opportunity to evaluate such citations to either affect the weight or overall evaluation of the URI 706. Thus, the content evaluation service 230 itself does not attempt to determine the accuracy of any submitted content, but instead allows users to provide evidence-based support for their opinion of the accuracy or inaccuracy, truthfulness or falsity, etc. of online content.

After the content evaluation service 230 has updated the evaluation web page associated with the URI 706, the updated web page is immediately made available for retrieval or further updating by other users. While this example provides evaluation of the URI as a whole, other examples may enable evaluation of a portion of content available at a URI.

Referring now to FIG. 9, FIG. 9 shows an example evaluation web page associated with a portion of content available via the URI 706 shown in FIG. 7. The web browser 700 navigates to the evaluation web page using the URI 906 and displays the evaluation web page 910 generally as discussed above with respect to FIG. 8. Similar to the example shown in FIG. 8, the evaluation web page 910 shows the URI being evaluated 920; however in this example, the user is evaluating only a selected portion of the web page. Thus, the request sent to the content evaluation service 230 includes both the URI and the selected portion of the content. In this example, the request has modified the URI to include the quoted portion of the content. While this URI is truncated in the displayed evaluation web page due to a lack of space, the full URI for this example is as follows:

www.ncweathernews.com/green_sky.html?"Residents of eastern North Carolina were greeted by the strange sight of a neon green sky this morning."

Thus, the selected portion of the web page has been appended to the end of the URI. Such a technique may work for small selections, e.g., less than 150 characters. For larger selections, such as multiple sentences, entire paragraphs or sections of a web page, other techniques may be employed. For example, the tool may generate a small HTML or XML file that includes the URI and the selected portion of the web page. In some examples, the request may include identifiers, such as metadata tags within the web page document, or other flags to identify the portions of the web page document selected by the user. Still further techniques may be employed to communicate the selected portion of a web page to the content evaluation service 230.

Similar to the example evaluation web page shown in FIG. 8, the evaluation web page shown in FIG. 9 includes a display of the selected portion 930 of the web page. The user is also provided options 940 to support 942a or refute 942b the selected portion and to enter a URI into a citation bar 950. After selecting an option 940 and entering the citation, the user may submit the evaluation of the selected portion 930 of the web page.

As discussed above, the content evaluation service 230 may update an existing evaluation web page or create a new one after the user presses the submit button 960. However, in this example, the content evaluation service 230 maintains a separate evaluation web page 910 for the URI for the web page and a second evaluation web page for the selected portion 930 of the web page. Thus, if an evaluation web page for the selected portion of the web page content does not exist at the content evaluation service 230, a new one is created and associated with the selected portion of the content generally as discussed above. However, in this example, because the association is not with the URI of the web page, but rather a dynamically constructed URI that includes the selected portion, the association is created with the dynamically constructed URI.

In some examples, the content evaluation service 230 may also create or maintain associations between an evaluation web page for a web page URI and any evaluation web pages for selected portions of the web page. Such associations may be stored in a hierarchical data structure, such as a tree, or a non-hierarchical data structure such as a graph, or any other suitable format, including storing references in one database record to other records within a database.

In addition to creating or updating one or more evaluation web pages, the content evaluation service 230 may also provide a notification that a web page or content within a web page has been evaluated. For example, the content evaluation service 230 may send a notification, such as an email or other message to the entity that published the web page. Contact information may be extracted from the web page itself, or from one or more links provided on the web page. In some examples, entities may register with the content evaluation service 230 and provide contact information to the content evaluation service 230.

Figure 10:
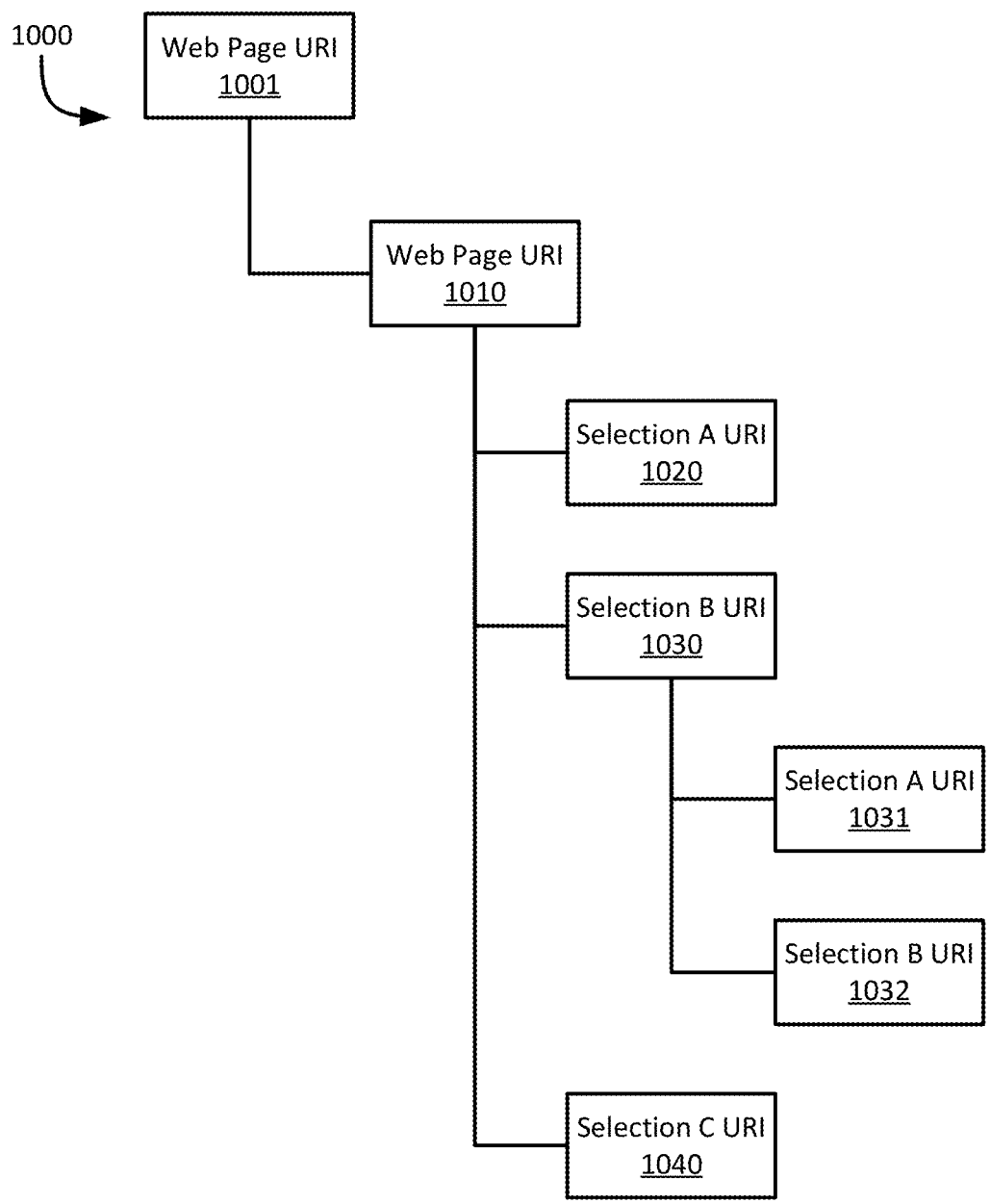
FIG. 10 shows an example hierarchical association tree for a web page URI and selected portions of the web page.

Referring now to FIG. 10, FIG. 10 illustrates an example hierarchical association tree 1000 for a web page URI and selected portions of the web page. The root node 1001 of the hierarchy in this example represents the top-level domain ("TLD") for the web page. The TLD generally represents the root web page of a web site, such as www.ncweathernews.com, while individual web pages for the TLD will be generated from the TLD, such as www.ncweathernews.com/green_sky.html as shown in FIGS. 7-9. Each of the individual web pages under the TLD may be represented by child nodes within the hierarchical association tree 1000 and have an associated evaluation web page. Further, TLD may have its own associated evaluation web page. In some examples, evaluation of a higher-level node within a tree structure may impact evaluation information for lower-level nodes. While in some examples, evaluation information for lower-level nodes within a tree structure may impact evaluation information for higher-level nodes, or the TLD itself. For example, if a large percentage of child nodes indicate inaccurate information, it may reduce evaluation information for the TLD. Thus, if at a later time, a new child node is created for a web page, its initial evaluation information may be biased based on the evaluation information for the TLD.

In the example shown in FIG. 10, child node 1010 of the hierarchy represents the evaluation web page associated with the web page located at www.ncweathernews.com/green_sky.html. Child nodes 1020, 1030, and 1040 represent evaluation web pages associated with selections of portions of the web page located at the URI. Child nodes 1031 and 1032 represent evaluation web pages associated with selections of portions of the web page located at the URI that are sub-portions of the selections represented by child node 1030. For example, child node 1030 may represent an evaluation web page for a section of a web page, while child nodes 1031 and 1032 may represent evaluation web pages for specific sentences or paragraphs within the section.

Figure 11:
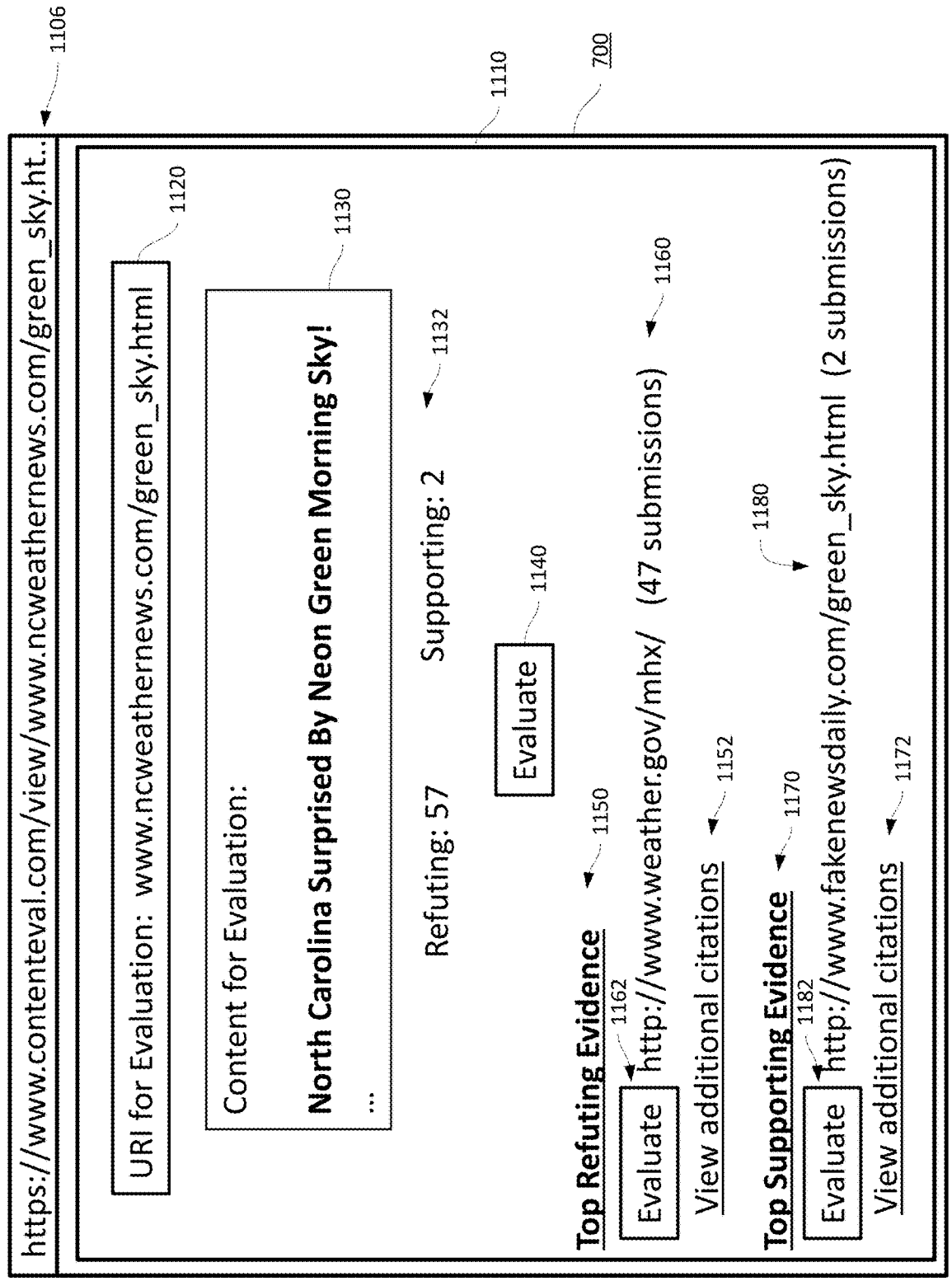
FIGS. 11-12 show example graphical user interfaces for interactive tools for dynamic evaluation of online content.

Referring now to FIG. 11, FIG. 11 illustrates an example evaluation web page 1110. In this example, the evaluation web page 1110 is associated with the URI 706 for the web page shown in FIG. 7. In this example, the web browser 700 is provided with a URI 1106 for the example evaluation web page for the URI 706, which provides the current evaluation status of the URI 706 as well as additional interactive features for the user. As can be seen in FIG. 11, the evaluation web page 1110 includes an indication 1120 of the URI being evaluated, and a view 1130 of the web page, which has been truncated due to space considerations. In some examples, the user may be able to view the full web page by scrolling within the view 1130.

The evaluation web page 1110 also provides the current count 1132 of submitted citations refuting and supporting the content of the web page, as well as a button 1140 to allow the user to evaluate the web page. In addition to the count 1132, the evaluation web page also includes sections 1150, 1170 listing the top refuting and supporting citations, as well as options to view any additional citations 1152, 1172. In this example, each section lists the citations 1160, 1180 with the most submissions or agreements, as well as the number of times the citation has been submitted or confirmed. Further, the evaluation web page provides evaluation buttons 1162, 1182 for each citation to allow users to evaluate the submitted evidence. Evaluation of such evidence may then be accomplished through an example process according to this disclosure, such as described above with respect to FIGS. 7-10.

It should be appreciated that, in some examples, evaluation information submitted by different users may reference the same content, but have different URIs. These differences may be the result of random numbers, timestamps, user identification information, or other information appended to, or otherwise incorporated into, the URI. Upon receiving a URI for evaluation information, the content evaluation service may determine whether the evaluation information has been previously submitted, such as by calculating a hash, checksum, or similar value for the submitted content, by comparing portions of the different submitted URIs, obtaining hint information from a hint service to determine portions of the URI that may be ignored, or any other suitable technique to determine whether received evaluation information has been previously submitted. Further, evaluation information itself may be evaluated using the techniques described in this disclosure. Thus, a quality of evaluation information may affect its weight with respect to scoring selected content.

In some examples, after receiving evaluation information, the content evaluation service may verify that the submitted URI is valid, such as by issuing an HTTP request for web content using the URI. If an error is returned, e.g., an HTML 404 error, the received evaluation information may be rejected.

In this example, the evaluation web page 1110 shows the number of refuting and supporting citations submitted to the content evaluation service 230 with respect to the URL 706. In some examples, however, the content evaluation service 230 may calculate a score for a URI, such as URI 706, or a portion of a web page based on citations provided and other information associated with a URI. For example, the evaluation web page in FIG. 11 indicates that 57 users have submitted citations allegedly refuting the web page located at the URI 706 shown in FIG. 7, while 2 users have submitted citations allegedly supporting it.

To compute a score for the URI 706, the content evaluation servicer 230 may determine a score for each submitted citation and combine the scores to create a total score for the URI 706. For example, multiple users all submitted the same citation to a federal government weather web site provided by the National Oceanic and Atmospheric Administration ("NOAA"). The content evaluation service 230 may then determine a quality of the citation, such as by obtaining a score for the cited URI 1160 or for the top-level domain ("TLD") associated with the URL, e.g., www.weather.gov in this instance. Such scores may be determined based on scores for web pages below the TLD as discussed above. The scores may then be added together to generate a total score for the web site, where scores for supporting citations have a positive sign, while scores for refuting citations have a negative sign.

For example, in this case, the top supporting citation has a score of 10 (on a scale of 1 to 10), while the top refuting citation has a score of 1 (on the same scale). Thus, to establish the score for the URI 706, the 47 citations are added to obtain a score of −470 (negative because they refute the content of the web page). The remaining 10 refuting citations, for example, collectively add up to −87. The two supporting citations add up to 2. Thus, the total score for the URI 706 is calculated to be −555. The score may then be compared to a scale or ranking provided by the content evaluation service, which indicates that scores below −100 are perceived by other users as being highly untrustworthy, while scores above 100 are perceived by other users as being highly trustworthy. In some examples, such scales may have multiple intermediate qualitative values, though in some examples, only the numerical score may be provided. Thus, a user may be able to quickly determine whether a web page is trustworthy or should be treated with skepticism. However, it should be appreciated that in some examples, the use of crowdsourced information, such as described above, may have differing levels of quality and thus, the user should ultimately make their own assessment as to the credibility of any particular web page and potentially provide their own evaluation information.

In the example shown in FIG. 11, the web page includes links 1152, 1172 to view other citations supporting or refuting the evaluated content. In some examples, the web page may include a list of such citations, which may be sorted according to a number of votes for the citations, a number of times the citation has been submitted, or a score calculated for the citations based on evaluation information for the citation URI itself.

Figure 12:
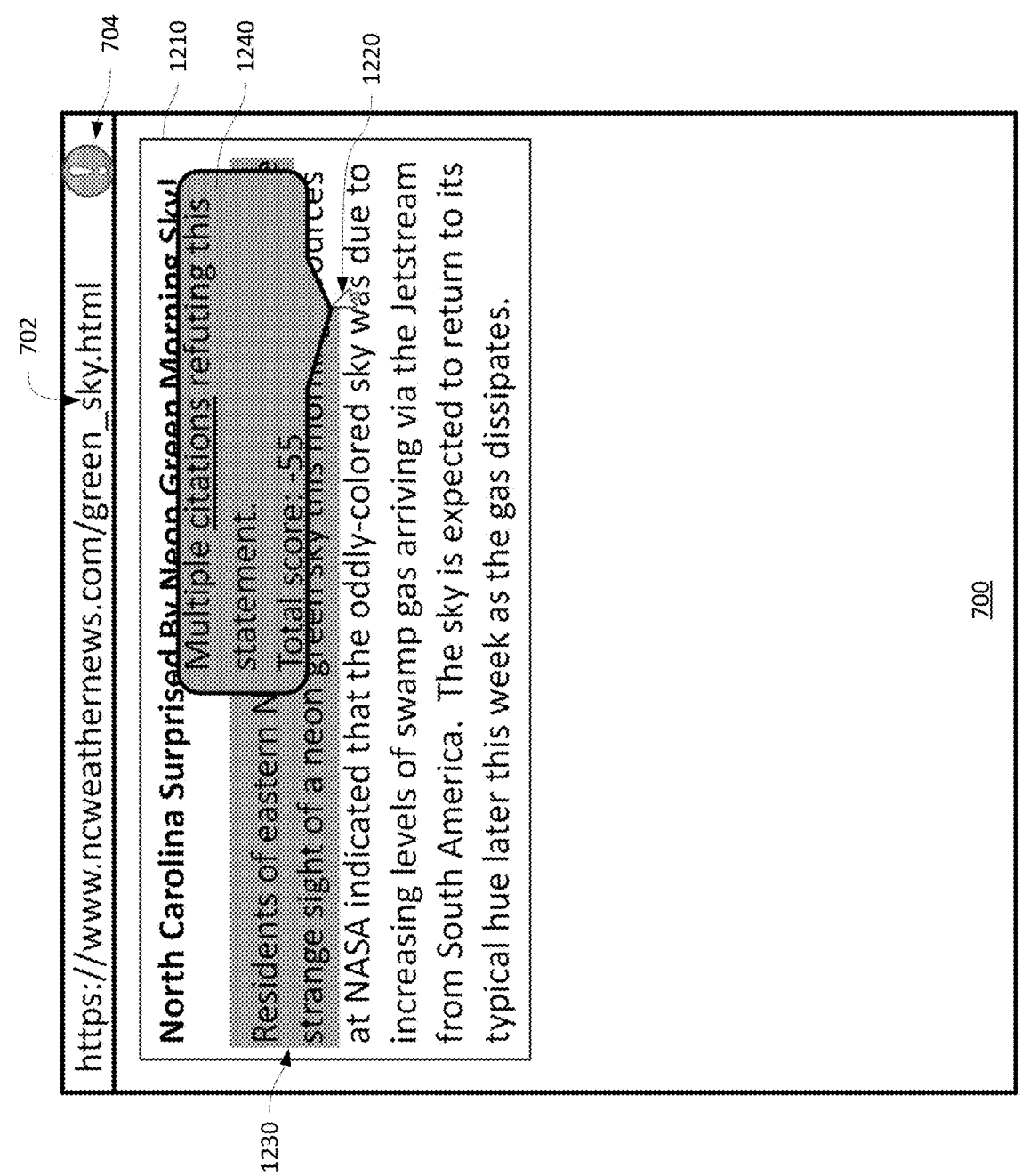

Referring now to FIG. 12, FIG. 12 shows an example GUI overlaid on a web page associated with a tool for dynamic evaluation of online content. In this example, the web browser 700 again displays a target web page 1210 from a URI 702 within a content window. As discussed above with respect to FIG. 7, the web browser 700 is enhanced by a button 704 for an interactive tool for dynamic evaluation of online content. In this example, the user has pressed the button 704 and selected from a context-sensitive menu an option to overlay evaluation information on the displayed web page.

In response to the user's request, the interactive tool has transmitted a request to the content evaluation service 230 with the URI 702 and requested evaluation information about the associated web page. In response, the content evaluation service 230 provided the evaluation information, which includes evaluation information specific to a sentence in the web page. In this example, the content evaluation service 230, in response to receiving the request, accessed evaluation information associated with the URI, but also evaluation information associated with portions of the web page associated with the URI, such as by traversing a hierarchical data structure and obtaining evaluation information for each node within the data structure.

After receiving the evaluation information, the interactive tool accesses the source file for the web page and determines the locations of different portions of the web page having associated evaluation information, such as by parsing the web page to identify a match between content within the web page and excerpted content contained in the evaluation information. After identifying matching content, in this example, the interactive tool inserts metadata tags into the web page source file to change the appearance of portions having associated evaluation information. In addition, each such portion has processor-executable instructions embedded within the web page source file to establish an interactive region.

For example, as can be seen in FIG. 12, the interactive tool has inserted metadata tags into the web page source file to highlight 1230 the first sentence of the article. Thus, the user is notified that the highlighted portions of the web page 1210 have associated evaluation information. In addition, the processor-executable instructions instruct the web browser 700 to generate dynamic text overlays having evaluation information. For example, as may be seen in FIG. 12, the first sentence has been highlighted 1230 and, when the user moves the mouse cursor 1220 over the highlighted portion 1230, a text window 1240 with evaluation information is overlaid on the web page 1210. In this example, the evaluation information indicates that multiple citations have been submitted refuting the highlighted statement 1230, and the word "citation" includes a hyperlink to the content evaluation service 230, which, if selected, will provide the evaluation web page associated with the highlighted portion 1230 of the web page. In addition, the text window 1240 indicates that the score for the statement is a −55, indicating the balance of submissions is weighted towards the statement being false or inaccurate. In this example, the score is calculated by converting the number of "refuting" votes to a negative number and then summing the number of "refuting" votes (57 in this example) with the number of "supporting" votes (2 in this example) to generate the score of −55.

And while in this example, the target web page 1220 has been annotated with highlighting and program code to provide overlaid evaluation information, the form such annotations or overlays can take may vary according to different examples. For example, annotations may affect the size, color, font, style (e.g., bold, underlined, italics, etc.), etc. of text within a web page. In some examples, annotations may be provided as hyperlinks, such as to one or more evaluation web pages at the content evaluation servicer 230. In some examples, annotations may be added as enumerated footnotes or endnotes, or other superscript or subscript characters. Such annotations may also be associated with program code to provide temporary textual or graphical overlays that may appear based on a user interaction with the annotation, or by a command display or hide such overlays.

Figure 13:
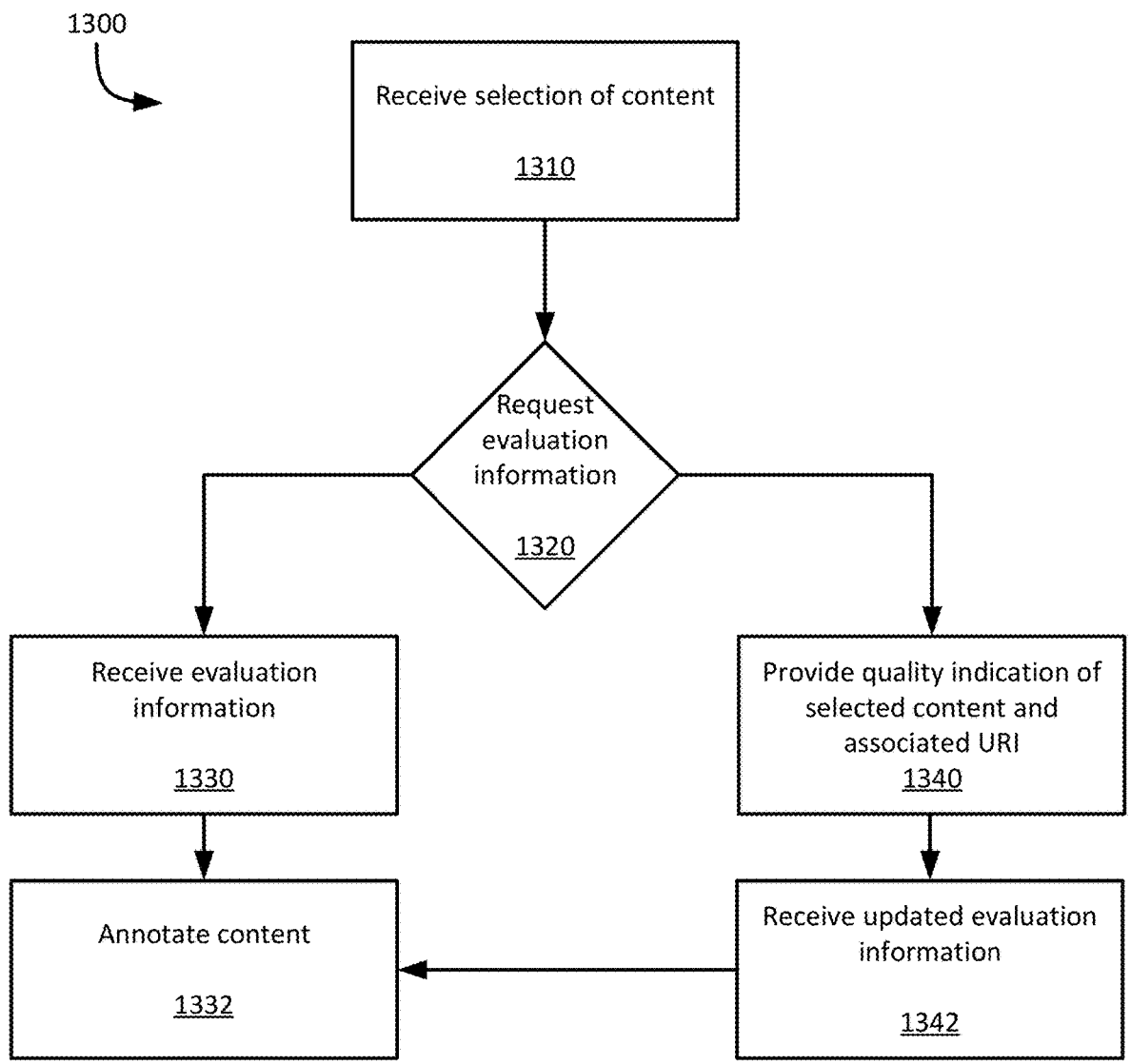
FIGS. 13-14 show example methods for interactive tools for dynamic evaluation of online content.

Referring now to FIG. 13, FIG. 13 shows an example method for providing interactive tools for dynamic evaluation of online content. The method 1300 shown in FIG. 13 will be described with respect to the system 200 shown in FIG. 2; however, any suitable system according to this disclosure may be employed.

At block 1310, the client device 210a receives a selection of content from a content provider 220a using a URI. In this example, the client device 210a executes a web browser 212a, which the user employs to access one or more web pages, generally as described above. The user may type a URI into the web browser's navigation bar or may select a hyperlink, a bookmark, or other URI reference to cause the web browser to retrieve content. After requesting the content using the URI, the web browser may receive one or more web objects as a part of a web page in response to transmitting a request to the URI.

In some examples, the client may select a portion of a web page or other content received from the URI. For example, after selecting a URI to access, the web browser obtains a web page from the URI, including portions of the web page that may be retrieved from other sources. The web browser may then display the web page for the user to view. The user may then select a portion of the displayed web page.

In some examples, content may refer to a web page, a portion of a web page, an image, a video, a sound clip, a social media post (e.g., a Facebook post, a "tweet" on the Twitter® service, etc.), or any other type of digital content available via a network. Further, while access to such content is described with respect to a URI, it should be appreciated that content accessed using a URI may include content that itself is not separately addressable using a URI. For example, a Facebook post may lack a URI separate from the www.facebook.com URI. Thus, while a Facebook post (or tweet or other content) may lack its own specific URI, it may still be accessible using a URI.

At block 1320, the web browser 212a receives a request for evaluation information associated with content displayed by the web browser 212a. In some examples, the user actively selects an option to request evaluation information, or in some examples, the web browser 212a, or plug-in or extension, may automatically issue a request to receive evaluation information, such as from the content evaluation service 230. The user request may be to receive evaluation information, such as from a content evaluation service 230, or it may be a request to provide evaluation information about the content, or a portion of the content, displayed by the web browser 212a.

To request evaluation information, the user may interact with the web browser 212a, such as by pressing a button or other GUI feature, such as described above with respect to FIGS. 4-6. In some examples, the user may select a portion of a content displayed by the web browser 212a, such as a portion of text, an image, a video or audio clip, social media post, etc. When selecting a portion of the displayed content, the user may be provided with, or may summon, a context sensitive menu that provides the option to either request evaluation information about the selected content, to provide evaluation about the selected content, or both.

In some examples, a user selection may encompass content obtained from multiple sources. For example, a user may select text and an image displayed by the web browser 212a, where the text is provided by one content provider via one URI, while the image is provided by another content provide via a different URI. If the user then issues a request for evaluation information, the request may be handled in different ways according to different examples. In one example, a request may be generated for both of the URIs, and evaluation information may be received or provided, or both, for both URIs. In some examples, the user may be provided with an option as to which content to request evaluation information. In further examples, the request may be automatically issued for the URI associated with the selected text, rather than the image, as the text may be more amenable to evaluation. In some examples, evaluation information may be generated or retrieved for the combined selection and only a single request for evaluation information may be generated.

To request the evaluation information, a request is transmitted to a content evaluation service, such as content evaluation service 230, for the evaluation information. In this example, the request includes a URI for the content. If evaluation information is requested for the web page as a whole, the URI for the web page is provided in this example; however, if a portion of the web page is selected, a URI corresponding to the selected portion. For example, if a text portion of the web page is selected, the URI of the document that includes the text portion is included in the request. If an image (or video or audio clip) is selected, the URI for the image (or video or audio clip) is included in the request. If multiple URIs are implicated by a selection, one or more of the URIs may be included in the request.

In this example, the request also includes an indication of whether evaluation content is to be retrieved from the content evaluation service 230, or if evaluation information is to be provided to the content evaluation service 230. The request is then transmitted to the content evaluation service 230. If the request is to retrieve evaluation information, the method proceeds to block 1330. If the request relates to providing evaluation information, the method proceeds to block 1340. If the request relates both to retrieving evaluation information and providing evaluation information, blocks 1330 and 1340 may be performed simultaneously, or sequentially, according to different examples.

At block 1330, the web browser 212a receives evaluation information from the content evaluation service 230. Evaluation information may be provided in any suitable format, such as in a markup language, unformatted text file, image, video, etc. In one example, the content evaluation service 230 may store evaluation information as HTML web pages that may be viewed or parsed by a web browser, such as described above with respect to FIGS. 7-11.

In this example, the evaluation information comprises one or more URIs for the evaluated web page or the portion of the web page, one or more URIs for citations, and one or more vote indications. The vote indications in this example include a number of votes for one or more categories, including "support," "refute," "inaccurate," "misleading," "true," "false," etc. For example, vote indications may include pairs of values, where each pair includes a category and a vote tally. In the context of an HTML document, vote indications may be provided in a format similar to the following:

<votes>
      <support>2</support>
      <refute>57</refute>
      . . .
   </votes>

The URIs in this example provide links to information provided by other users who previously evaluated the content. The URIs identify articles, videos, images, etc. that support or refute the content within the web browser. In addition, the URIs may be associated with a vote tally. For example, the evaluation information may include a URI and one or more corresponding vote tally, where the vote tallies may be associated with categories, such as those discussed above:

citations
      <support>
         <URI>http://www.fakenewsdaily.com/green_sky.html</URI>
         <votes>2</votes>
      </support>
      <refute>
         <URI>http://www.weather.gov/mhx</URI>
         <votes>47</votes>
      </refute>
      . . .
   </citations>

As discussed above, URIs provided as citations for evaluation information may also have associated evaluation. Thus, in some examples, the content evaluation server 230 may provide evaluation information for URIs provided in evaluation information for the content displayed in the web browser 212a. It may further recursively obtain evaluation information for any or all URIs provided in the evaluation information until it reaches a threshold number of recursions or until no further evaluation information is available.

For example, the evaluation information for a displayed web page may include a citation to "http://www.weather.gov/mhx." The content evaluation service 230 may have evaluation information for the citation, which the content evaluation service 230 obtains and includes with the evaluation information for the displayed web page, but associates this additional evaluation information with the citation. Thus, the user viewing the web page may be able to view evidence directly supporting (or refuting) the content displayed by the web browser 212a, but may also see indications of the quality of the supporting (or refuting) evidence.

The URIs for the web page, or portion of the web page, may be used to associate evaluation information with particular portions of the web page, or to position annotations at block 1332 appropriately within the displayed web page. For example, the URI may simply indicate the URI for the displayed web page. Alternatively, the URI may indicate the portion of the web page by incorporating the URI for the web page with a portion (or all) of a selected portion of text to enable the web browser 212a (or plug-in or extension) to locate the relevant content within the web page. The URIs in some examples, may be associated with the citations or vote information, such as in the following format:

<EvaluatedContent>
   <URI>www.ncweathernews.com/green_sky.html</URI>
   <SelectedText>"Residents of eastern North Carolina were greeted by the strange sight of a neon green sky this morning."</SelectedText>
   citations
     . . .
   </citations>
   <votes>
     . . .
   </votes>
</EvaluatedContent>

Other techniques to associate URIs, selected portions of content, and evaluation information may be employed as well, in other examples.

At block 1332, after receiving the evaluation information, the web browser 212*a* may annotate the displayed content. For example, the web browser 212*a* may modify the source file for the web page to insert annotation information at a location corresponding to the evaluated content. Annotations may be provided in the form of highlighting, inserted hyperlinks, superscript text (e.g., "*citation*") following evaluated content, JavaScript or other executable program code, etc. The annotations may be inserted directly into the underlying source code for the web page, or may be ingested by a plug-in or extension and dynamically applied to the displayed content after it is rendered.

A user may interact with such annotations by clicking on the annotation, hovering over the annotation, etc. to view the evaluation information, or be presented with an option to obtain more detailed evaluation information, such as from the content evaluation service 230. For example, referring again to FIG. 12, a portion of the web page has been highlighted 1220 to provide a visual indication of annotation information. Further, the highlighted portion is associated with JavaScript code to generate a pop-up bubble indicating that the sentence has been refuted multiple times, and containing a hyperlink ("citations") to more detailed evaluation information. If the user selects the hyperlink, they may be taken to a different web page, such as the example shown in FIG. 11, to view more detailed evaluation information. Thus, the client device 210*a* or the web browser 212*a* may modify the visual appearance or functionality of the displayed content to provide annotation information to an interested user. Such annotations may further provide the user with the opportunity to provide further evaluation information for those portions of the content. Alternatively, as discussed above, the user may select other portions to evaluate.

After completing block 1332, the method 1300 may end, or it may return to block 1310, if the user selects further content to view.

If, at block 1320, the user indicated she desired to provide evaluation information, the method proceeds to block 1340. At block 1340, the user provides a quality indication of the selected content. In this example, after selecting the option to provide the quality indication, the user may be presented with an interactive window in which she may provide a URI to evidence regarding the selected content or a vote regarding other evaluation information previously provided to the content evaluation service 230. In some examples, the user may be redirected to a web page provided by the content evaluation service 230 that maintains evaluation information for the selected content, whether for the web page as a whole or selected portions of the web page.

In some examples, the user may be allowed to provide multiple URIs to support or refute the selected content. For example, the user may be able to provide an unordered list of such URIs, or instead may identify a sequence for the URIs, which may provide a coherent analytical progression supporting or refuting the selected content. For example, the user may provide, in an ordered list, a first URI for a legal statute, a second URI for a Supreme Court decision regarding the legal statute, and a third URI for legal commentary regarding the Supreme Court decision. In some examples, the user may cite as evidence only a portion of the content available via a URI. For example, if the user wants to cite only a single paragraph from a lengthy article, she may enter the URI and be presented with the corresponding web page, at which time the user may navigate to the relevant portion or begin typing a quoted portion, which may be used by the web browser to jump to the relevant portion within the corresponding web page. The user may then select the relevant portion and submit the URI plus the selected portion as a quality indication.

As discussed above, the content evaluation service 230 may maintain separate web pages for each portion of evaluated content, whether a web page or a portion of a web page. Thus, when requesting to provide a quality indication, the content evaluation service 230 may provide that web page, or an associated web page designed to accept additional evaluation information. Such a web page may be presented to the user as an overlay on the content displayed by the web browser 212*a*, as a separately-displayed web page in a new tab within the web browser 212*a*, or any other suitable format. The user may then provide her evaluation information, such as a URI for evidence regarding the selected content, a vote on previously provided evidence, or both, and submit it to the content evaluation service 230.

At block 1342, the web browser 212*a* receives updated evaluation information for the selected content, generally as discussed above with respect to block 1330; however, the updated evaluation information is based on the quality information provided by the user. Thus, in some examples, the URI provided by the user may be included in the updated evaluation information, or the user's vote may be included, or both. After receiving the updated evaluation information, the method proceeds to block 1332 to annotate the content using the updated evaluation information generally as described above.

While the discussion of the example method above begins at block 1310, in some examples, the method may begin at block 1320. For example, a user may navigate to the content evaluation service and request evaluation information to browse. For example, the user may be interested in evaluation information regarding a particular topic, rather than for a specific piece of content. Thus, the user may browse to a web site for the content evaluation service and issue a request for evaluation information related to a new bill introduced in Congress, a recent noteworthy event, or other issue of interest the user. The content evaluation service may then provide evaluation information to the user generally as described at block 1330, or by displaying a listing of hyperlinks or portions of evaluation web pages for popular news articles, YouTube videos, tweets, etc. The user may then, from browsing such evaluation web pages, navigate to the content corresponding to a particular evaluation web page, review the content, and submit their own evaluation information, such as by using techniques described herein.

Figure 14:
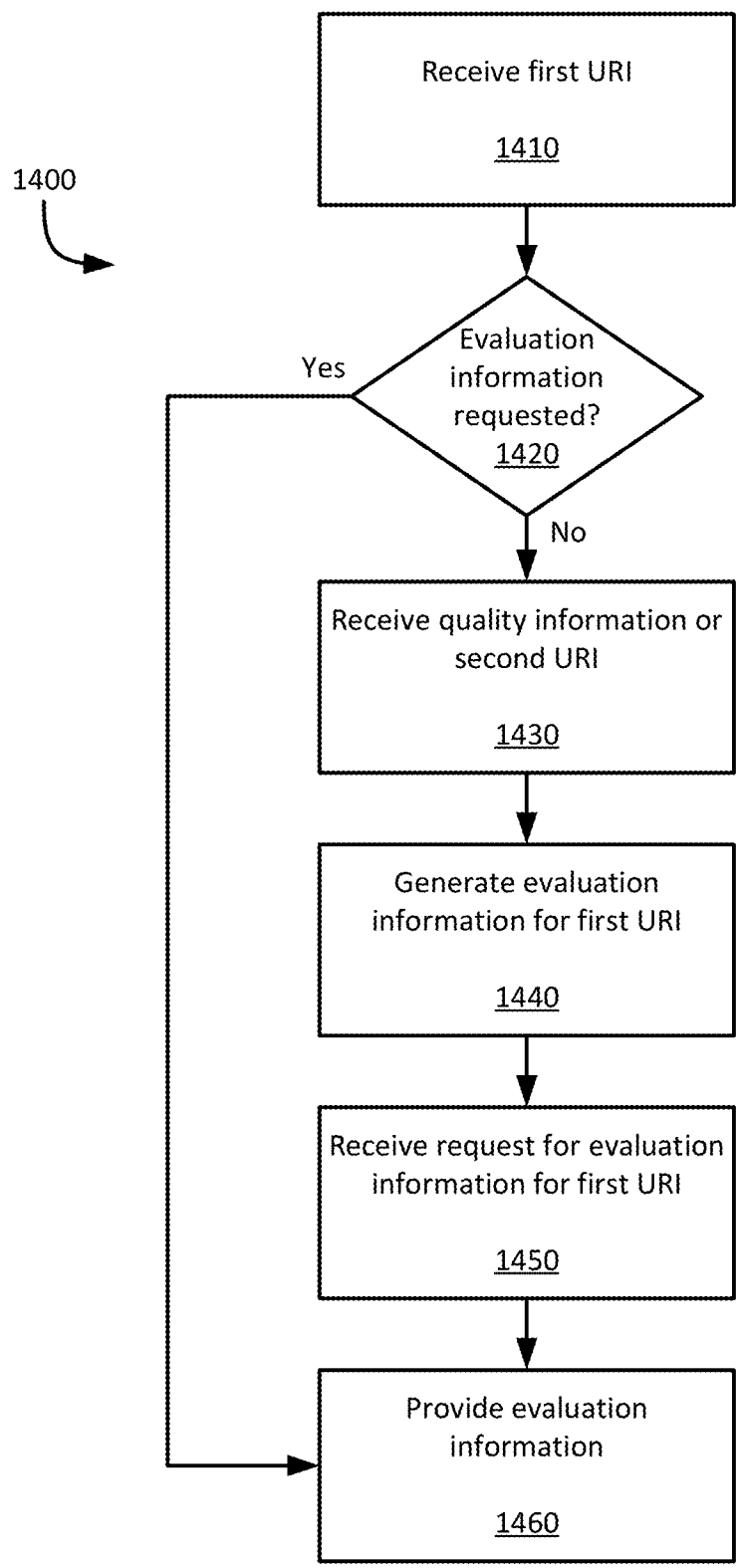

Referring now to FIG. 14, FIG. 14 shows an example method 1400 for interactive tools for dynamic evaluation of online content. The method 1400 shown in FIG. 14 will be described with respect to the system 200 shown in FIG. 2; however, any suitable system according to this disclosure may be employed.

At block 1410, the content evaluation service 230 receives a first URI from a client device 210a. In this example, the content evaluation service 230 receives a request from the client device 210a, such as described above with respect to block 1320 of FIG. 13. The first URI relates to a web page or portion of a web page that a user is viewing in the web browser 212a, referred to as the "target web page" in this discussion for clarity. In this example, the request includes the first URI and an indication of whether evaluation information is requested or new evaluation information is to be provided.

At block 1420, the content evaluation service 230 determines whether existing evaluation information is requested or new evaluation information is to be provided. If existing evaluation information is requested, the method 1400 proceeds to block 1460; otherwise the method 1400 proceeds to block 1430. It should be appreciated that a request for evaluation information may request both existing evaluation information and to provide new evaluation information. In such an instance, both paths from block 1420 may be traversed simultaneously, or in sequence, such as by first traversing from block 1420 to 1460, and then returning to block 1420 and traversing to block 1430.

At block 1430, the content evaluation service 1430 receives quality information or a second URI from the client device 210a. In this example, the client device 210a provides a URI for a web page providing evidence refuting information on the target web page. In some examples, however, the client device 210a may identify a particular portion of a URI as providing evidence. For example, the client device 210a may provide a URI and a reference to content within a web page referenced by the URI. Thus, quality information may provide a pinpoint identification to the content evaluation service. Some such examples may be advantageous if a URI references a lengthy web page, such as a doctoral thesis, and only a small portion of the web page is relevant as quality information. Further, in some examples the quality information may include multiple URIs or pinpoint citations to content available in one or more URIs. For example, a user may provide citations to multiple URIs, which may address different aspects of the evaluated content, or the multiple URIs may be identified in a particular sequence to lay out a particular analytical argument or position with respect to the evaluated content. In some examples, the client device 210a may provide quality information, such as a vote or similar non-URI-based indication of quality. In some examples, the client device 210a may provide both a URI and quality information, or may provide multiple URIs or multiple instances of quality information, such as votes regarding multiple previously-provided URIs to evidence.

In this example, the quality information is provided through an evaluation web page served from the content evaluation service 230 to the client device 210a for the target web page. Some examples of evaluation web pages are discussed above with respect to FIGS. 8-11. In some examples, however, a user may interact with a pop-up window overlaid on the target web page, such as provided via JavaScript code, with form fields allowing the user to enter one or more URIs or quality information, which may then be submitted to the content evaluation service 230.

Thus, in some examples, the user may interact with the content evaluation service 230 directly via an evaluation web page or indirectly through a plug-in, extension, script, or other processor-executable code executing on the client device 210a.

At block 1440, the content evaluation service 230 generates evaluation information for the URI for the target web page. In this example, the content evaluation server 230 autonomously generates evaluation information; however, in some examples, a person may be involved in creating the evaluation information, such as by generating a new evaluation web page, adding content to an existing evaluation web page, generating a score for an identified URI, etc.

In one example, the content evaluation service 230 updates an evaluation web page for the target web page's URI (or the URI for a selected portion of the target web page). For example, the content evaluation service 230 may add the URI received at block 1430 to the evaluation web page, it may increase a vote count for one or more URIs associated with evidence regarding the target web page (a "citation URI"), or it may generate a quality score for the target web page based on received evidence and votes.

In some examples, the content evaluation service 230 may calculate a quality score for a target web page (or portion of a target web page) according to any suitable formula. In one example, each citation URI may be assigned a quality score. The number of votes for each such URI may then be multiplied by its quality score. Then all votes for all the citation URIs may be summed to achieve a quality score for the target web page. In some examples, citation URIs may be assigned a default quality score if no other quality score is available. In other examples, citation URIs may have their own quality score computed according to different examples, which may then be retrieved by the content evaluation service 230 and used to calculate a quality score for the target web page as discussed above.

If an evaluation web page for the target web page does not exist, the content evaluation service may generate a new evaluation web page and generate an association between the target web page's URI and the new evaluation web page. In some examples, the content evaluation service may associate evaluation web pages from multiple URIs. For example, if a web site includes multiple different pieces of content that are all related to the same topic or the same underlying content, such as an article, video, social media post, etc., the content evaluation service may associate each of these different pieces of content with the same evaluation web page, either instead of, or in addition to, associating the different pieces of content with their own dedicated evaluation web page.

At block 1450, the content evaluation service 230 receives a request for evaluation information for the target web page's URI. For example, after the user supplies information to the content evaluation service 230, the web browser 212a (or a plug-in or extension) may issue a request for the updated evaluation information. In some examples, the user may reload the target web page. In some examples, however, the content evaluation service 230 may not receive such a request, but may instead automatically provide the updated evaluation information by proceeding directly to block 1460 from block 1440.

At block 1460, the content evaluation service 230 provides evaluation information to the client device 210a, such as by transmitting a copy of the evaluation web page, a separate file or message having one or more citation URIs, votes, or a quality score, etc.

It should be appreciated that while the example method 1400 was described with respect to a target "web page" for ease of discussion, it should be appreciated that the method 1400 may be employed for any content available via a network, including social media posts, videos, images, excerpts of web pages, advertisements, etc. Thus, where reference is made to a "target web page," any other online content may employed instead.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
   receiving, by a client device, a selection of first content from a first content provider, the first content obtained using a first uniform resource identifier ("URI");
   in response to receiving, by the client device, a request to access evaluation information associated with the first URI, transmitting a request to access the evaluation information to a second content provider using a second URI;
   receiving, by the client device from the second content provider, second content associated with the first URI, the second content having the evaluation information;
   generating, by the client device, annotations for the first content using the evaluation information; and
   displaying the first content and the annotations, the annotations displayed within the first content.

2. The method of claim 1, further comprising:
   transmitting, by the client device to the second content provider, updated quality information comprising a quality indication of the first content and a third URI for third content available from a third content provider, the third content associated with the quality of the first content;
   receiving, by the client device from the second content provider, updated second content comprising updated evaluation information associated with the first content, the updated evaluation information based on the third content and the quality indication; and
   generating, by the client device, updated annotations for the first content using the updated second content; and
   displaying the first content and the updated annotations, the updated annotations displayed within the first content.

3. The method of claim 2, wherein the third content comprises content supporting or refuting the selected first content.

4. The method of claim 1, wherein the transmitting the request to the second content provider is further in response to receiving the selection of the first content.

5. The method of claim 1, wherein the selected first content comprises a portion of a web page associated with the first URI, and the second content is further associated with the portion of the web page.

6. The method of claim 1, wherein annotating the first content comprises inserting metadata tags into a received source file for the first content.

7. The method of claim 1, wherein annotating the first content comprises inserting a reference indicator into a received source file for the first content.

8. The method of claim 1, further comprising displaying an interactive visual indicator overlaid on at least a portion of the selected first content, the interactive visual indicator providing one or more of (i) a hyperlink to an evaluation web page for the selected first content; or (ii) an indication of a quality score for the selected first content.

9. A non-transitory computer-readable medium comprising processor-executable instructions configured to cause a processor to:
   receive a selection of first content from a first content provider, the first content obtained using a first uniform resource identifier ("URI");

in response to receipt of a request to access evaluation information associated with the first URI, transmit a request to access the evaluation information to a second content provider using a second URI;

receive, from the second content provider, second content associated with the first URI, the second content having the evaluation information; and generate one or more annotations for the first content using the evaluation information; and display the first content and the one or more annotations, the one or more annotations displayed within the first content.

10. The non-transitory computer-readable medium of claim 9, further comprising processor-executable instructions configured to cause a processor to:

transmit, to the second content provider, updated quality information comprising a quality indication of the first content and a third URI for third content available from a third content provider, the third content associated with the quality of the first content;

receive, from the second content provider, updated second content comprising updated evaluation information associated with the first content, the updated evaluation information based on the third content and the quality indication; and annotate the first content using the updated second content.

11. The non-transitory computer-readable medium of claim 10, wherein the third content comprises content supporting or refuting the selected first content.

12. The non-transitory computer-readable medium of claim 9, wherein the transmitting the request to the second content provider is further in response to receipt of the selection of the first content.

13. The non-transitory computer-readable medium of claim 9, wherein the selected first content comprises a portion of a web page associated with the first URI, and the second content is further associated with the portion of the web page.

14. The non-transitory computer-readable medium of claim 9, wherein generating the one or more annotations for the first content comprises inserting metadata tags into a received source file for the first content.

15. The non-transitory computer-readable medium of claim 9, wherein generating the one or more annotations for the first content comprises inserting a reference indicator into a received source file for the first content.

16. The non-transitory computer-readable medium of claim 9, further comprising processor-executable instructions configured to cause a processor to display an interactive visual indicator overlaid on at least a portion of the selected first content, the interactive visual indicator providing one or more of (i) a hyperlink to an evaluation web page for the selected first content; or (ii) an indication of a quality score for the selected first content.

17. A device comprising:

a non-transitory computer-readable medium comprising processor-executable instructions; and a processor coupled to the non-transitory computer-readable medium, the processor configured to execute the processor-executable instructions to cause the processor to:

receive a selection of first content from a first content provider, the first content obtained using a first uniform resource identifier ("URI");

in response to receipt of a request to access evaluation information associated with the first URI, transmit a request to access the evaluation information to a second content provider using a second URI;

receive, from the second content provider, second content associated with the first URI, the second content having the evaluation information; and generate one or more annotations for the first content using the evaluation information; and display the first content and the one or more annotations, the one or more annotations displayed within the first content.

18. The device of claim 17, the processor further configured to execute the processor-executable instructions to cause the processor to:

transmit, to the second content provider, updated quality information comprising a quality indication of the first content and a third URI for third content available from a third content provider, the third content associated with the quality of the first content;

receive, from the second content provider, updated second content comprising updated evaluation information associated with the first content, the updated evaluation information based on the third content and the quality indication; and annotate the first content using the updated second content.

19. The device of claim 18, wherein the third content comprises content supporting or refuting the selected first content.

20. The device of claim 17, wherein the transmitting the request to the second content provider is further in response to receipt of the selection of the first content.

21. The device of claim 17, wherein the selected first content comprises a portion of a web page associated with the first URI, and the second content is further associated with the portion of the web page.

22. The device of claim 17, the processor further configured to execute the processor-executable instructions to cause the processor to insert metadata tags into a received source file for the first content.

23. The device of claim 17, the processor further configured to execute the processor-executable instructions to cause the processor to insert a reference indicator into a received source file for the first content.

24. The device of claim 17, the processor further configured to execute the processor-executable instructions to cause the processor to display an interactive visual indicator overlaid on at least a portion of the selected first content, the interactive visual indicator providing one or more of (i) a hyperlink to an evaluation web page for the selected first content; or (ii) an indication of a quality score for the selected first content.

* * * * *